US010740288B2

(12) United States Patent
Eda et al.

(10) Patent No.: US 10,740,288 B2
(45) Date of Patent: Aug. 11, 2020

(54) ACCESSING OBJECTS IN AN ERASURE CODE SUPPORTED OBJECT STORAGE ENVIRONMENT

(71) Applicant: International Business Machines Corporation, Armonk, NY (US)

(72) Inventors: Sasikanth Eda, Vijayawada (IN); Rezaul S. Islam, Tucson, AZ (US); John T. Olson, Tucson, AZ (US); Sandeep R. Patil, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 839 days.

(21) Appl. No.: 15/367,846

(22) Filed: Dec. 2, 2016

(65) Prior Publication Data

US 2018/0157671 A1 Jun. 7, 2018

(51) Int. Cl.
*G06F 16/13* (2019.01)
(52) U.S. Cl.
CPC .................................. *G06F 16/13* (2019.01)
(58) Field of Classification Search
CPC ........................................................ G06F 16/13
See application file for complete search history.

(56) References Cited

U.S. PATENT DOCUMENTS

| 8,131,667 B1* | 3/2012 | Snider | G06F 16/13 |
| | | | 707/609 |
| 8,244,903 B2* | 8/2012 | Bono | G06F 16/10 |
| | | | 709/232 |
| 8,504,535 B1 | 8/2013 | He et al. | |

(Continued)

FOREIGN PATENT DOCUMENTS

CN 102385622 A 3/2012

OTHER PUBLICATIONS

Disclosed Anonymously, *Method for I/O performance improvement in Erasure Code environment*, An IP.com Prior Art Database Technical Disclosure, <http://ip.com/IPCOM/000228152D> (online), IP.com Electronic Publication Date: Jun. 10, 2013, 8 pages.

(Continued)

*Primary Examiner* — Shew Fen Lin
(74) *Attorney, Agent, or Firm* — Peter J. Edwards (57) ABSTRACT

Accessing objects in an erasure code supported object storage environment including receiving, from a requesting entity, a read request for an object stored in the object storage environment; identifying, using a placement data structure, an object fragment location of a first object fragment of the object; calculating, based on a filesystem root inode number and the object fragment location, a first inode address for the first object fragment of the object, wherein the first inode address identifies a location on a first storage node; reading, using the first inode address, the first object fragment and an inode structure, wherein the inode structure for the first inode address comprises a second inode address for a second object fragment of the object; reading the second object fragment using the second inode address, wherein the second inode address identifies a location on a second storage node; and providing, to the requesting entity, a reconstructed object comprising the first object fragment and the second object fragment.

15 Claims, 6 Drawing Sheets

(56) References Cited

U.S. PATENT DOCUMENTS

| | | | |
|---|---|---|---|
| 8,935,307 B1* | 1/2015 | Srinivasan | G06F 3/067 |
| | | | 707/827 |
| 9,148,174 B2 | 9/2015 | Baker et al. | |
| 9,281,845 B1 | 3/2016 | Lazier | |
| 9,959,280 B1* | 5/2018 | Whitehead | G06F 16/162 |
| 2009/0164409 A1* | 6/2009 | Mukherjee | G06F 16/13 |
| 2010/0011037 A1* | 1/2010 | Kazar | G06F 3/0605 |
| | | | 707/E17.01 |
| 2013/0339818 A1* | 12/2013 | Baker | G06F 3/0667 |
| | | | 714/E11.034 |
| 2014/0188868 A1 | 7/2014 | Hunter et al. | |

OTHER PUBLICATIONS

Disclosed Anonymously, *Method for ensuring reliability semantics in file system environment*, An IP.com Prior Art Database Technical Disclosure, <http://ip.com/IPCOM/000234103D> (online), IP.com Electronic Publication Date: Jan. 13, 2014, 6 pages.

Remzi H. Arpaci-Dusseau et al., *Operating Systems: Three Easy Pieces*, Chapter 40: File System Implementation, <http://pages.cs.wisc.edu/~remzi/OSTEP/file-implementation.pdf>, Operating Systems [Version 0.91], dated Aug. 2016, 18 pages.

IBM, *GPFS File Placement Optimizer*, IBM Knowledge Center, <https://ibm.biz/BdXB2x>, printed Oct. 25, 2016, 1 page.

* cited by examiner

ACCESSING OBJECTS IN AN ERASURE CODE SUPPORTED OBJECT STORAGE ENVIRONMENT

BACKGROUND

Field of the Invention

The field of the invention is data processing, or, more specifically, methods, apparatus, and products for accessing objects in an erasure code supported object storage environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for accessing objects in an erasure code supported object storage environment are disclosed in this specification. Accessing objects in an erasure code supported object storage environment includes receiving, from a requesting entity, a read request for an object stored in the object storage environment; identifying, using a placement data structure, an object fragment location of a first object fragment of the object; calculating, based on a filesystem root inode number and the object fragment location, a first inode address for the first object fragment of the object, wherein the first inode address identifies a location on a first storage node; reading, using the first inode address, the first object fragment and an inode structure, wherein the inode structure for the first inode address comprises a second inode address for a second object fragment of the object, and wherein reading inode structure for the first object fragment comprises reading, from the inode structure for the first object fragment, the second inode address for the second object fragment; reading the second object fragment using the second inode address, wherein the second inode address identifies a location on a second storage node; and providing, to the requesting entity, a reconstructed object comprising the first object fragment and the second object fragment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
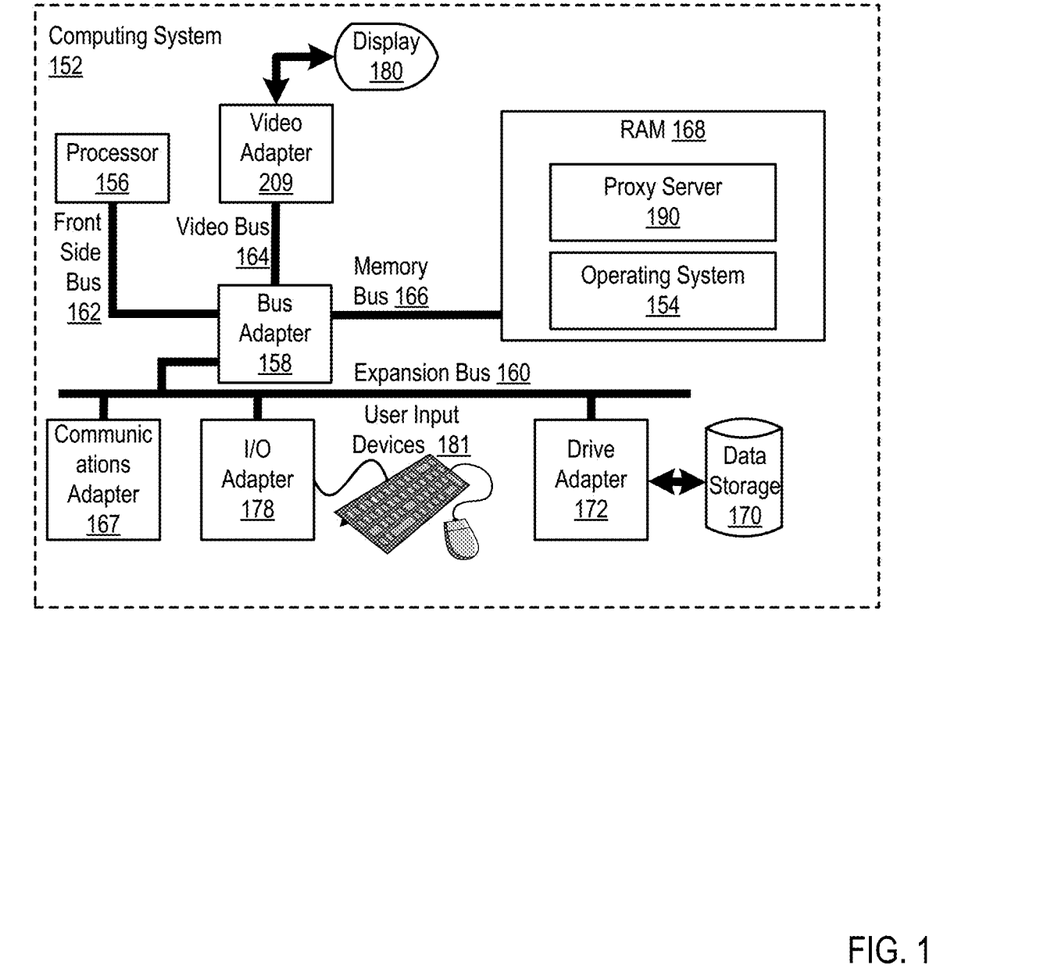
FIG. 1 sets forth a block diagram of an example system configured for accessing objects in an erasure code supported object storage environment according to embodiments of the present invention.

Exemplary methods, apparatus, and products for accessing objects in an erasure code supported object storage environment in accordance with the present invention are described with reference to the accompanying drawings, beginning with FIG. 1. FIG. 1 sets forth a block diagram of automated computing machinery comprising an exemplary computing system (152) configured for accessing objects in an erasure code supported object storage environment according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154) and a proxy server (190). Operating systems useful in computers configured for accessing objects in an erasure code supported object storage environment according to embodiments of the present invention include UNIX™, Linux™, Microsoft XP™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for accessing objects in an erasure code supported object storage environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for accessing objects in an erasure code supported object storage environment according to embodiments of the present invention include modems for wired dial-up communications, Ethernet (IEEE 802.3) adapters for wired data communications, and 802.11 adapters for wireless data communications.

Figure 2:
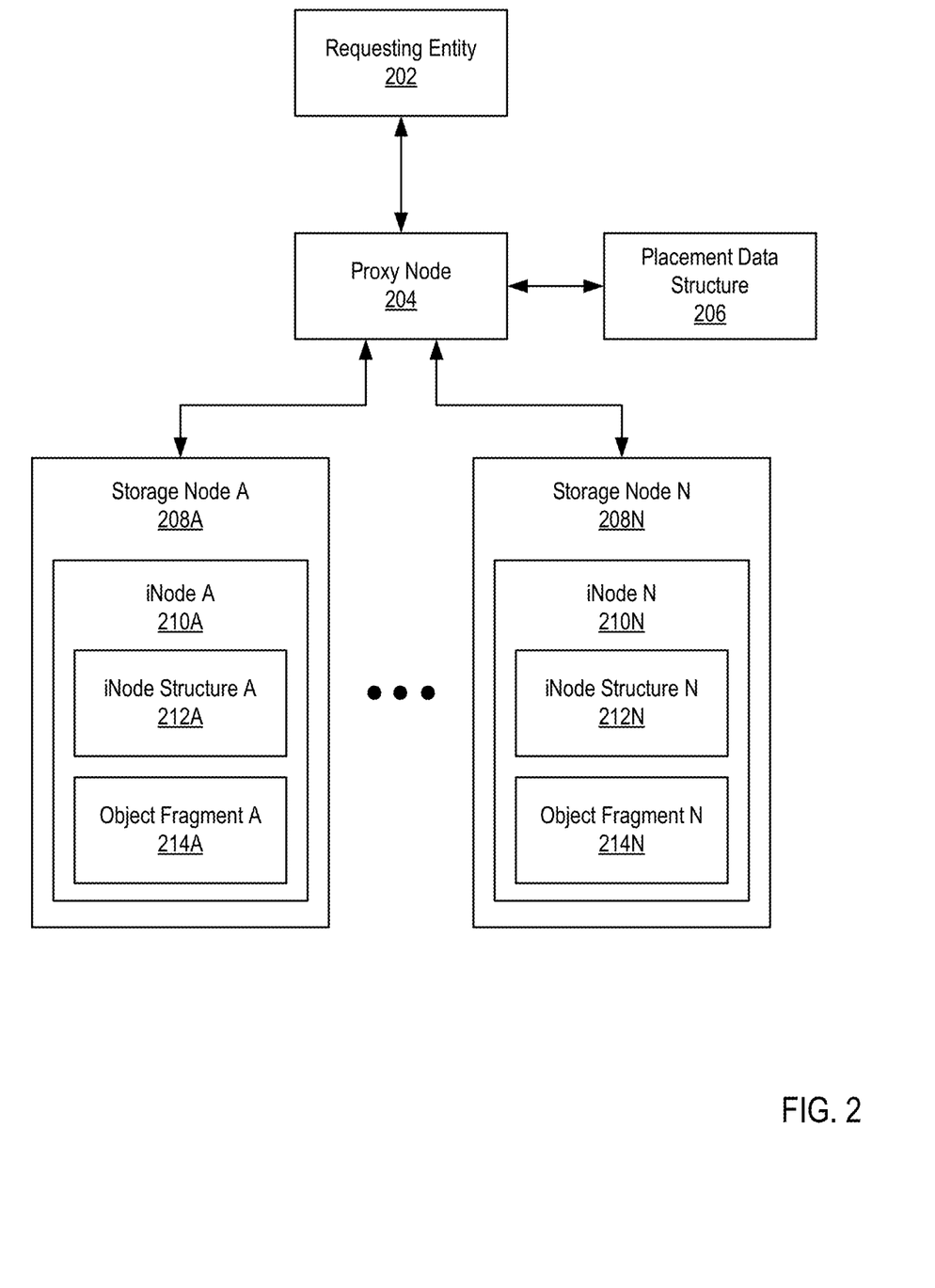
FIG. 2 sets forth a block diagram for accessing objects in an erasure code supported object storage environment according to embodiments of the present invention.

FIG. 2 shows a system for accessing objects in an erasure code supported object storage environment in accordance with the present invention. As shown in FIG. 2, the system includes a requesting entity (202), a proxy node (204), a placement data structure (206), and a plurality of storage nodes (storage node A (208A), storage node N (208N)). Each storage node (storage node A (208A), storage node N (208N)) includes one or more inodes (inode A (210A), inode N (210N)). Each inode (inode A (210A), inode N (210N)) includes an inode structure (inode structure (212A), inode structure N (212N)) and an object fragment (object fragment A (214A), object fragment N (214N)).

The requesting entity (202) is computing system or component of a computing system that sends a read request to the proxy node (204). The requesting entity (202) may be a system remote to the proxy node (204) or may be an interface within the proxy node (204) that communicates with other entities internal and external to the proxy node (204). The requesting entity (202) may be an input/output (I/O) client of the object storage system.

The proxy node (204) and the storage nodes (storage node A (208A), storage node N (208N)) are components of an object storage environment, such as an erasure code object storage architecture environment, which may include additional proxy nodes and storage nodes not shown in FIG. 2. The storage architecture may implement a file system such as General Parallel File System™ or LUSTRE™ file system. The proxy node (204) is a computing system hosting a proxy server. The proxy node (204) may service requests and perform load balancing. I/O requests, such as read requests, are serviced by the proxy server on the proxy node (204) utilizing the storage nodes (storage node A (208A), storage node N (208N)).

The placement data structure (206) is an information repository that maps object identifiers received in read requests to corresponding filesystem root inode numbers. The placement data structure (206) may be stored on the proxy node (204) or located on a separate computing system. The placement data structure (206) may also be distributed among a number of proxy nodes or other computing systems.

Each storage node (storage node A (208A), storage node N (208N)) is a computing system used to store data in the form of objects or object fragments (object fragment A (214A), object fragment N (214N)). The storage nodes may store objects by dividing the objects into slices or object fragments (data fragments and parity fragments), and distributing the object fragments (object fragment A (214A), object fragment N (214N)) across a number of storage nodes. Further, each object may be written to the storage nodes as a set of object fragments (object fragment A (214A), object fragment N (214N)) such that only a subset of the object fragments is necessary to reconstruct the object. For example, an object may be stored on a system using 16 object fragments stored on 16 different storage nodes. In servicing a read request, the proxy node (214) may require only nine object fragments from nine storage nodes to reconstruct the object.

Each storage node (storage node A (208A), storage node N (208N)) may be local to the proxy node (204) or may be communicatively coupled over a local or wide area network. Each storage node (storage node A (208A), storage node N (208N)) may handle writing object fragments to the disk or storage subsystems and reading an object fragment for an object from the disk or storage subsystem. Specifically, each storage node (storage node A (208A), storage node N (208N)), under the direction of the proxy node (204), independently stores and reads the object fragment stored on that storage node.

Each inode (inode A (210A), inode N (210N)) is a structure used to index and store an object or object fragment (object fragment A (214A), object fragment N (214N)). Each inode is stored at an inode address, which may be calculated for the storage node using the filesystem root inode number. Each inode may include the associated object fragment data or a pointer to the block locations on the storage node at which the object fragment data is stored.

Each inode structure (inode structure (212A), inode structure N (212N)) includes data or metadata about the inode. The inode structure (inode structure (212A), inode structure N (212N)) may include a name, a size, a creation time, an access time, a modify time, permission details, and block locations of the object data. Each inode structure (inode structure (212A), inode structure N (212N)) may also include a list of other inode addresses of the other object fragments that make up an object.

During a write operation, the proxy node (204) receives a write request and data to be stored on the storage nodes. The proxy node (204) then calculates the number of object fragments to which the received data will be written based on the erasure code schema selected by the user. The proxy node (204) then calculates the location to be used by each storage node at which the object fragments will be written. Each storage node then writes the object fragment to corresponding fragment location. Upon write completion of writing each object fragment, the fragment inode address is returned to proxy server, where all fragment inodes corresponding to an object are collected and each fragment inode structure is updated with collected inode addresses of all fragments of the object. Each storage node also writes the inode address of each other object fragment on each other storage node for that object.

For example, the proxy node (204) may determine that an object will be written in four object fragments to four storage nodes at addresses x0003 on storage node node-1, x0018 on storage node node-2, x0022 on storage node node-3, and x0033 on storage node node-4. The proxy node (204) then provides the first object fragment to node-1 along with the addresses x0018, x0022 and x0033. Storage node node-1 then stores the first object fragment at inode address x0003, and stores, in the inode structure for the first object fragment, the addresses x0018, x0022 and x0033.

Similarly, the proxy node (204) provides the second object fragment to node-2 along with the addresses x0003, x0022 and x0033. Storage node node-2 then stores the first object fragment at inode address x0018, and stores, in the inode structure for the first object fragment, the addresses x0003, x0022 and x0033. The same is done for the third and fourth object fragments. As a result, each inode that stores an object fragment also stores the inode addresses of each other object fragment on the other storage nodes.

Figure 3:
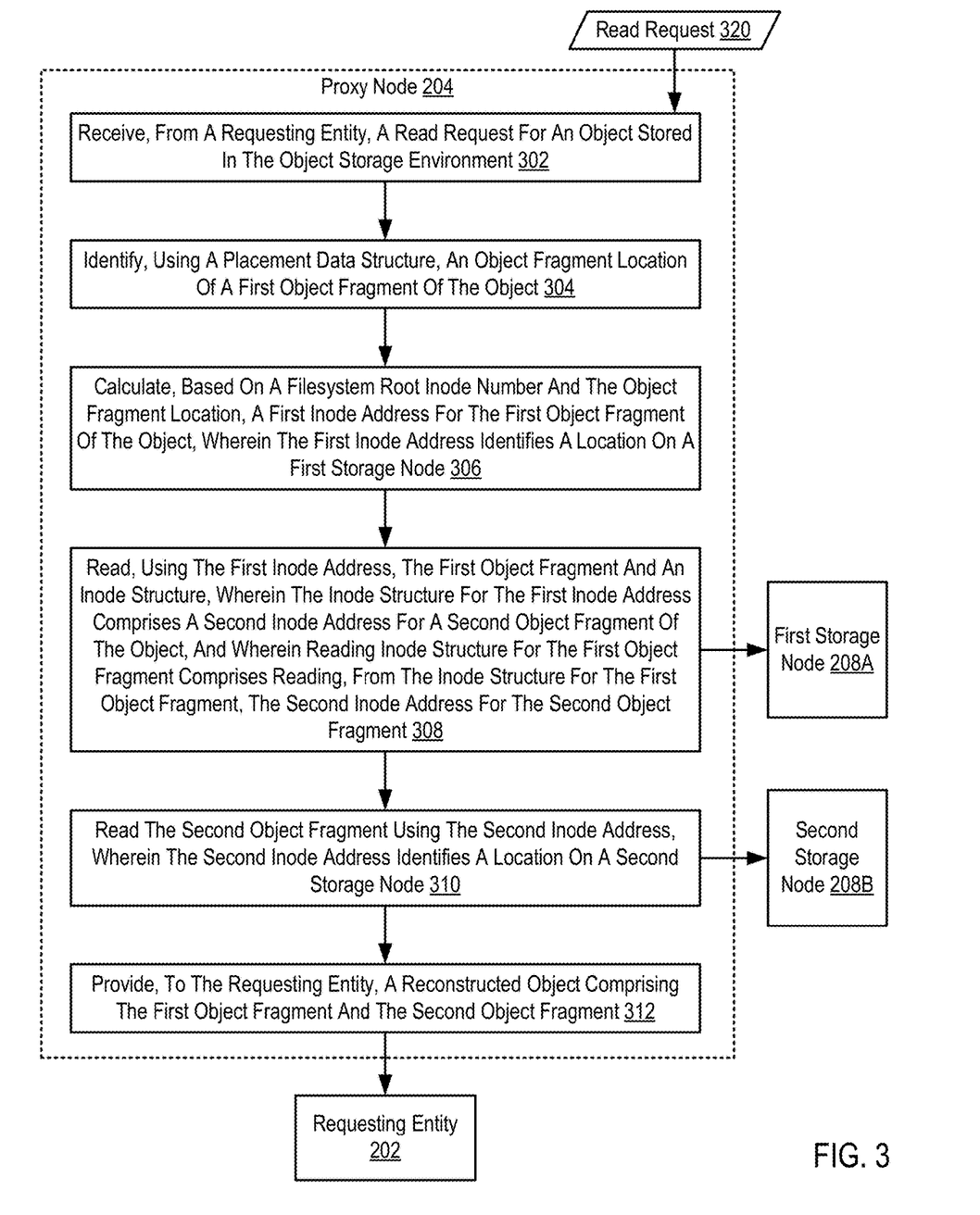
FIG. 3 sets forth a flow chart illustrating an exemplary method for accessing objects in an erasure code supported object storage environment according to embodiments of the present invention.

For further explanation, FIG. 3 sets forth a flow chart illustrating an exemplary method for accessing objects in an erasure code supported object storage environment according to embodiments of the present invention. The method of FIG. 3 includes receiving (320), from a requesting entity (202), a read request (320) for an object stored in the object storage environment. Receiving (320), from a requesting entity (202), a read request (320) for an object stored in the object storage environment may be carried out by a proxy server on a proxy node receiving the read request. The read request may include an identifier of the object and a directory for the object. For example, the read request (320) may include the instruction 'open("/foo/bar/obj.data").

The method of FIG. 3 also includes identifying (304), using a placement data structure, an object fragment location of a first object fragment of the object. Identifying (304), using a placement data structure, an object fragment location of a first object fragment of the object may be carried out by querying the placement data structure using the object hash. Once a matching object hash is found, the corresponding location of the object fragment may be read out of the placement data structure.

Once the object fragment location is identified, the proxy node (204) selects a first storage node from which to read the first object fragment and inode structure. The first storage node may be selected from a plurality of storage nodes that store object fragments of the object. Selecting a storage node as the first storage node may be based on the resources available on each storage node. For example, the node with the most available resources (in terms of CPU, memory, etc.), compared to the other storage nodes, may be selected as the first storage node. Additionally, the proxy node (204) may select the first node based on the response time of each storage node to a message sent from the proxy node (204).

The proxy node (204) may further determine a number of object fragments necessary to reconstruct the object, and select a number of storage nodes based on that requirement. For example, an object may be stored across 16 object fragments in 16 storage nodes. The proxy node (204) may determine that only nine object fragments are necessary to reconstruct the object. Therefore, the proxy node (204) may select nine storage nodes to service the request.

The method of FIG. 3 also includes calculating (306), based on a filesystem root inode number and the object fragment location, a first inode address for the first object fragment of the object, wherein the first inode address identifies a location on a first storage node (208A). Calculating (306), based on a filesystem root inode number and the object fragment location, a first inode address for the first object fragment of the object, wherein the first inode address identifies a location on a first storage node (208A) may be carried out by using the location of the object fragment, the filesystem root inode number, and information from the first storage node (208A) in order to determine the inode address. For example, the inode number may be used to calculate an offset into an inode region on the first storage node (208A) that stores the inode associated with the first inode address.

The method of FIG. 3 also includes reading (308), using the first inode address, the first object fragment and an inode structure, wherein the inode structure for the first inode address comprises a second inode address for a second object fragment of the object, and wherein reading inode structure for the first object fragment comprises reading, from the inode structure for the first object fragment, the second inode address for the second object fragment. Reading (308), using the first inode address, the first object fragment and an inode structure may be carried out by using the calculated inode address to access the inode for the first object fragment on the first storage node (208A). Once the inode is accessed, the inode structure may be read and the inode addresses for the other object fragments of the object may be obtained. The object fragment may also be read using the inode, either from within the location identified by the inode address, or using a pointer to the object fragment data stored in the inode.

The method of FIG. 3 also includes reading (310) the second object fragment using the second inode address, wherein the second inode address identifies a location on a second storage node (208B). Reading (310) the second object fragment using the second inode address, wherein the second inode address identifies a location on a second storage node (208B) may be carried out by using the second inode address stored in the inode structure for the first object fragment to access the inode for the second object fragment on the second storage node (208B).

For example, the inode structure for the first object fragment may include the addresses x0018, x0022 and x0033. The inode address x0018 may identify a location on the second storage node (208B). Using the inode address x0018, the second object fragment may be read, either from the inode identified by the inode address x0018, or using a pointer to the second object fragment data stored at the inode address x0018.

Calculating the inode addresses for each inode on each storage node may, over time, occupy a large number of resources. By storing, in each inode structure, the inode addresses for each other object fragment for an object, only the first inode address need be calculated. Once the first inode address is calculated, the other inode address may be obtained from that first inode structure, and the other storage nodes need not calculate the inode address for the other object fragments. Rather, those other object fragments may be read directly using the inode addresses obtained from the first inode structure without calculating the other inode addresses.

The method of FIG. 3 also includes providing (312), to the requesting entity (202), a reconstructed object comprising the first object fragment and the second object fragment. Providing (312), to the requesting entity (202), a reconstructed object comprising the first object fragment and the second object fragment may be carried out by reconstructing the object from the first object fragment and the second object fragment. Each object fragment may be a data fragment or parity fragment, and reconstructing the object may include calculating the object data using the data fragments and parity fragments. Providing (312), to the requesting entity (202), the reconstructed object may also include storing the reconstructed object in a memory location on the proxy node and providing the requesting entity (202) a pointer to the memory location.

Figure 4:
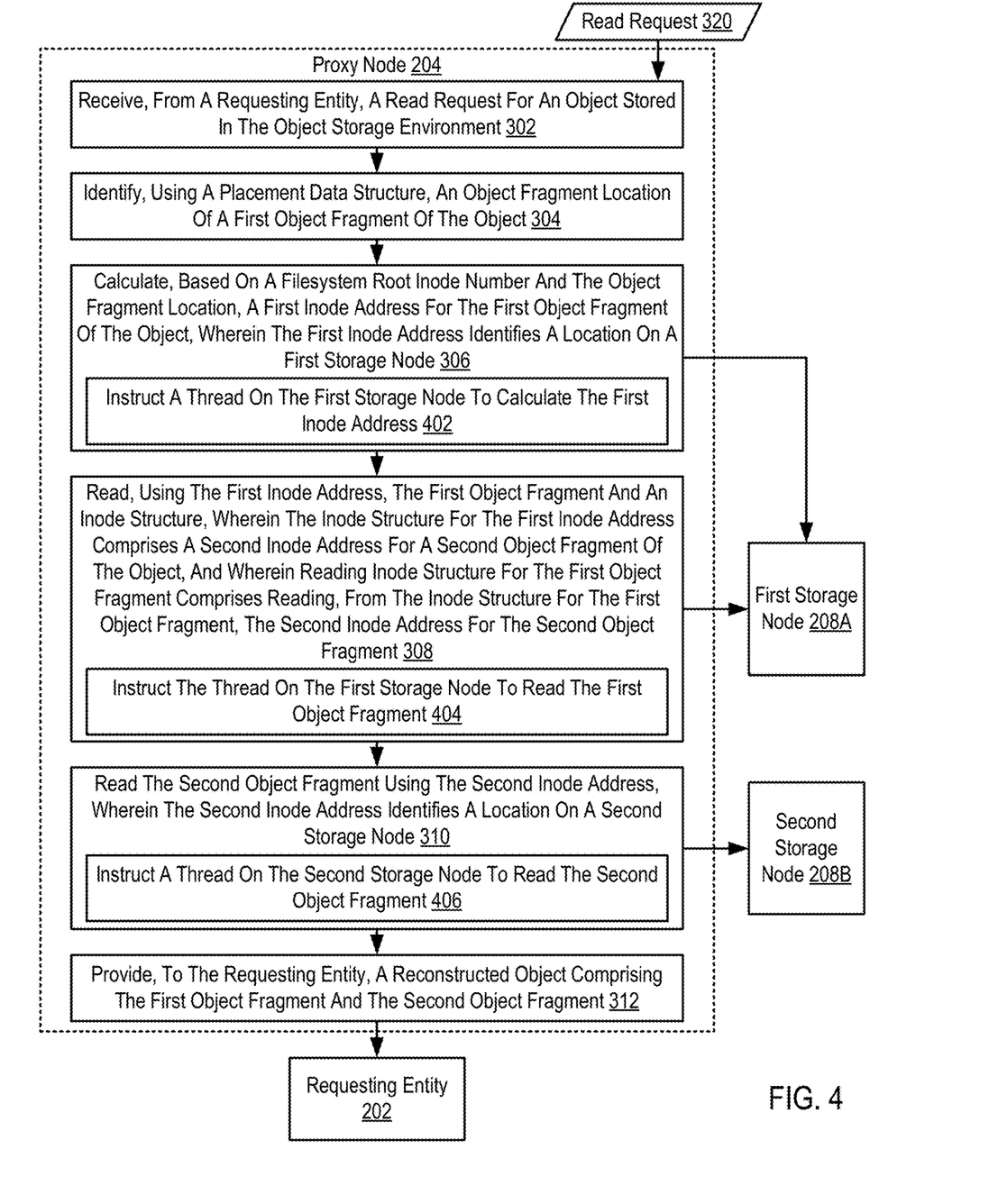
FIG. 4 sets forth a flow chart illustrating an exemplary method for accessing objects in an erasure code supported object storage environment according to embodiments of the present invention.

For further explanation, FIG. 4 sets forth a flow chart illustrating a further exemplary method for accessing objects in an erasure code supported object storage environment according to embodiments of the present invention that includes receiving (302), from a requesting entity (202), a read request (320) for an object stored in the object storage environment; identifying (304), using a placement data structure, an object fragment location of a first object fragment of the object; calculating (306), based on a filesystem root inode number and the object fragment location, a first inode address for the first object fragment of the object, wherein the first inode address identifies a location on a first storage node (208A); reading (308), using the first inode address, the first object fragment and an inode structure, wherein the inode structure for the first inode address comprises a second inode address for a second object fragment of the object, and wherein reading inode structure for the first object fragment comprises reading, from the inode structure for the first object fragment, the second inode address for the second object fragment; reading (310) the second object fragment using the second inode address, wherein the second inode address identifies a location on a second storage node (208B); and providing (312), to the requesting entity (202), a reconstructed object comprising the first object fragment and the second object fragment.

The method of FIG. 4 differs from the method of FIG. 3, however, in that calculating (306), based on a filesystem root inode number and the object fragment location, a first inode address for the first object fragment of the object, wherein the first inode address identifies a location on a first storage node (208A) includes instructing (402) a thread on the first storage node to calculate the first inode address. Instructing (402) a thread on the first storage node to calculate the first inode address may be carried out by the proxy node (204) sending a message to the first storage node (208A) to calculate the first inode address. In response, the first storage node (208A) may spawn a thread or instruct an existing thread or group of threads to perform the task. The calculating (306) the first inode address may be performed by the storage node. Specifically, the calculation may be performed by a thread or group of threads executing on the storage node.

The method of FIG. 4 also differs from the method of FIG. 3, in that reading (308), using the first inode address, the first object fragment and an inode structure includes instructing (404) the thread on the first storage node to read the first object fragment. Instructing (404) the thread on the first storage node to read the first object fragment may be carried out by the proxy node (204) sending a message to the first storage node (208A) to read the object fragment and the inode structure. In response, the first storage node (208A) may spawn a thread or instruct the existing thread or group of threads to perform the task.

The method of FIG. 4 also differs from the method of FIG. 3, in that reading (310) the second object fragment using the second inode address, wherein the second inode address identifies a location on a second storage node (208B) includes instructing (406) a thread on the second storage node to read the second object fragment. Instructing (406) a thread on the second storage node to read the second object fragment may be carried out by the proxy node (204) sending a message that includes the second inode address to the second storage node (208B). In response, the first storage node (208A) may spawn a thread or instruct the existing thread or group of threads to read the object fragment.

Figure 5:
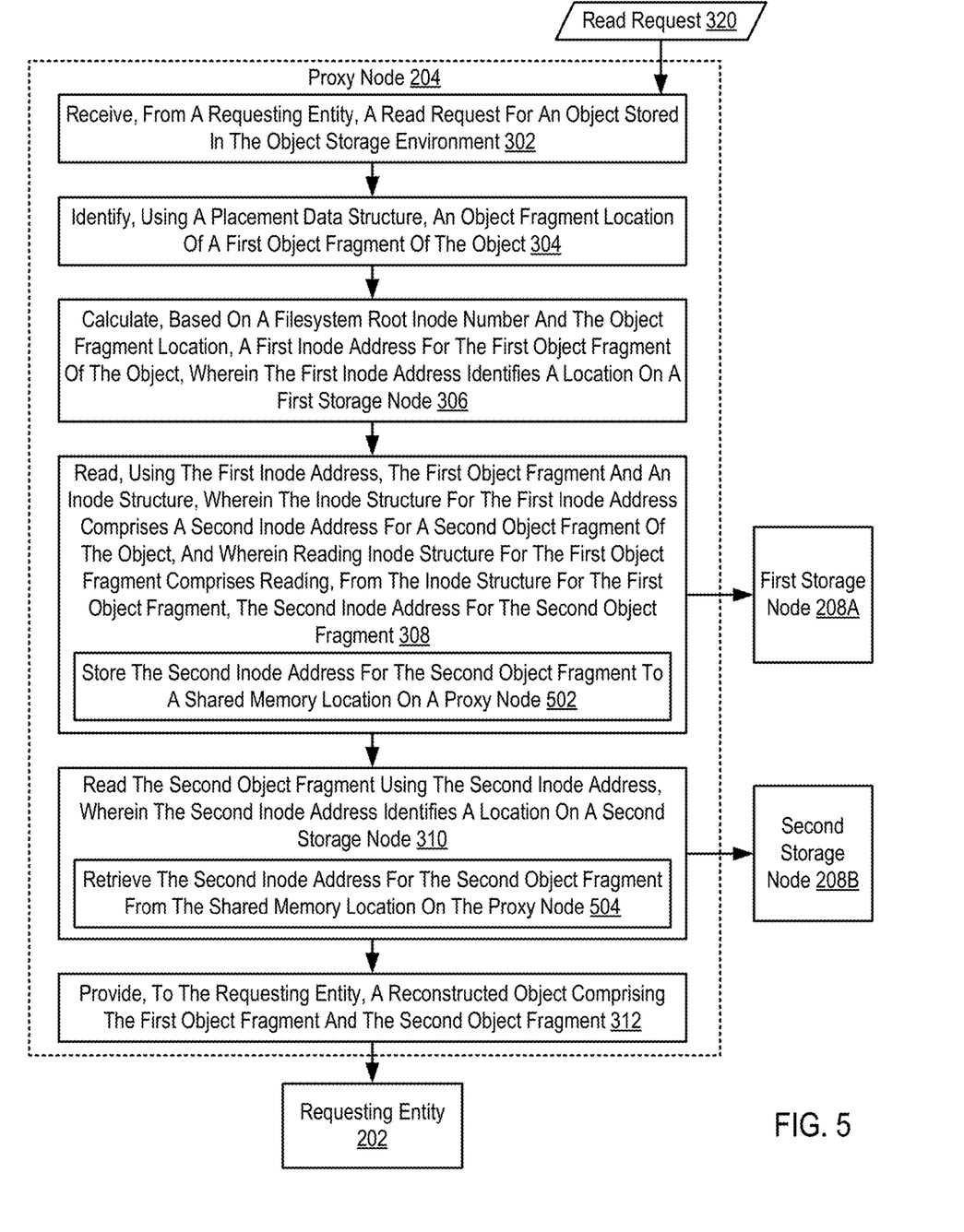
FIG. 5 sets forth a flow chart illustrating an exemplary method for accessing objects in an erasure code supported object storage environment according to embodiments of the present invention.

For further explanation, FIG. 5 sets forth a flow chart illustrating a further exemplary method for accessing objects in an erasure code supported object storage environment according to embodiments of the present invention that includes receiving (302), from a requesting entity (202), a read request (320) for an object stored in the object storage environment; identifying (304), using a placement data structure, an object fragment location of a first object fragment of the object; calculating (306), based on a filesystem root inode number and the object fragment location, a first inode address for the first object fragment of the object, wherein the first inode address identifies a location on a first storage node (208A); reading (308), using the first inode address, the first object fragment and an inode structure, wherein the inode structure for the first inode address comprises a second inode address for a second object fragment of the object, and wherein reading inode structure for the first object fragment comprises reading, from the inode structure for the first object fragment, the second inode address for the second object fragment; reading (310) the second object fragment using the second inode address, wherein the second inode address identifies a location on a second storage node (208B); and providing (312), to the requesting entity (202), a reconstructed object comprising the first object fragment and the second object fragment.

The method of FIG. 5 differs from the method of FIG. 3, however, in that reading (308), using the first inode address, the first object fragment and an inode structure includes storing (502) the second inode address of the second object fragment to a shared memory location on a proxy node (204). Storing (502) the second inode address of the second object fragment to a shared memory location on a proxy node (204) may be carried out by extracting, from the inode structure for the first object fragment, the inode addresses of the other object fragments for the object, including the second inode address. The second inode address may be received by the proxy node (204) from the first storage node (208A) and placed in a memory location accessible by the other storage nodes, including the second storage node (208B).

The method of FIG. 5 also differs from the method of FIG. 3, in that reading (310) the second object fragment using the second inode address, wherein the second inode address identifies a location on a second storage node (208B) includes retrieving (504) the second inode address of the second object fragment from the shared memory location on the proxy node may be carried out by the proxy node (204) or directly by the second storage node (208B). Specifically, the proxy node (204) may provide the second inode address to the second storage node (208B) or a thread on the second storage node (208B) may read the memory location directly.

Figure 6:
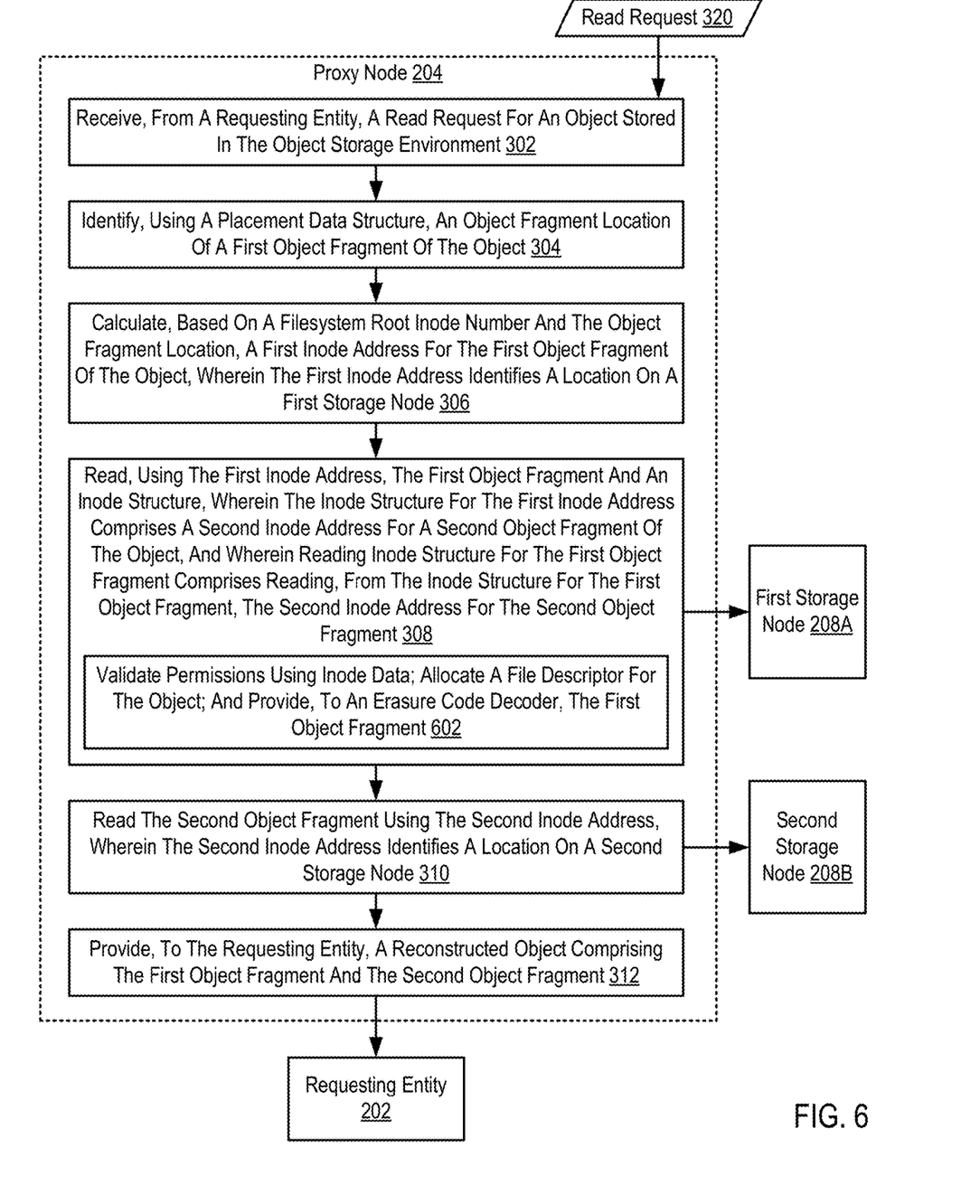
FIG. 6 sets forth a flow chart illustrating an exemplary method for accessing objects in an erasure code supported object storage environment according to embodiments of the present invention.

For further explanation, FIG. 6 sets forth a flow chart illustrating a further exemplary method for accessing objects in an erasure code supported object storage environment according to embodiments of the present invention that includes receiving (302), from a requesting entity (202), a read request (320) for an object stored in the object storage environment; identifying (304), using a placement data structure, an object fragment location of a first object fragment of the object; calculating (306), based on a filesystem root inode number and the object fragment location, a first inode address for the first object fragment of the object, wherein the first inode address identifies a location on a first storage node (208A); reading (308), using the first inode address, the first object fragment and an inode structure, wherein the inode structure for the first inode address comprises a second inode address for a second object fragment of the object, and wherein reading inode structure for the first object fragment comprises reading, from the inode structure for the first object fragment, the second inode address for the second object fragment; reading (310) the second object fragment using the second inode address, wherein the second inode address identifies a location on a second storage node (208B); and providing (312), to the requesting entity (202), a reconstructed object comprising the first object fragment and the second object fragment.

The method of FIG. 6 differs from the method of FIG. 3, however, in reading (308), using the first inode address, the first object fragment and an inode structure includes validating (602) permissions using inode data; allocating a file descriptor for the object; and providing, to an erasure code decoder, the first object fragment.

Validating (602) permissions using inode data may be carried out by determining that the permission settings for the object fragment allow the object fragment to be read. Allocating a file descriptor for the object may be carried out by the proxy node (204) selecting a location on the proxy node (204) to store the reconstructed object and each object fragment. Providing, to an erasure code decoder, the first object fragment may be carried out by transferring the object fragment data from the first storage node (208A) to the proxy node (204) and then reconstructing, by the erasure code decoder, the object from the object fragments.

In view of the explanations set forth above, readers will recognize that the benefits of accessing objects in an erasure code supported object storage environment according to embodiments of the present invention include:
  Improving the operation of a computer system by increasing the efficiency of read operations performed within erasure code supported object storage environments, increasing the functionality of the computing systems.
  Improving the operation of a computer system by reducing redundant calculations of inode addresses within erasure code supported object storage environments, increasing the efficiency and reliability of object storage.

Exemplary embodiments of the present invention are described largely in the context of a fully functional computer system for accessing objects in an erasure code supported object storage environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of accessing objects in an erasure code supported object storage environment, the method comprising:
    receiving, from a requesting entity, a read request for an object stored in the object storage environment, wherein the object comprises a plurality of object fragments, and wherein the object corresponds to a plurality of inodes that each includes both an object fragment of the plurality of object fragments and collected inode addresses of each other object fragment of the object;
    identifying, using a placement data structure, an object fragment location of a first object fragment of the object;
    calculating, based on a filesystem root inode number and the object fragment location, a first inode address for the first object fragment of the object, wherein the first inode address identifies a location on a first storage node;
    reading, using the first inode address, the first object fragment and an inode structure, wherein the inode structure for the first inode address comprises a second inode address for a second object fragment of the object, and wherein reading the inode structure for the first object fragment comprises reading, from the inode structure for the first object fragment, the second inode address for the second object fragment, without calculating the second inode address, based on the collected inode addresses of each other object fragment of the object;
    reading the second object fragment using the second inode address, wherein the second inode address identifies a location on a second storage node; and
    providing, to the requesting entity, a reconstructed object comprising the first object fragment and the second object fragment.

2. The method of claim 1, wherein an inode structure for the second object fragment comprises the first inode address of the first object fragment.

3. The method of claim 1, wherein each inode structure for each object fragment comprises each other inode address for each object fragment.

4. The method of claim 1, wherein calculating, based on the filesystem root inode number and the object fragment location, the first inode address for the first object fragment of the object comprises instructing a thread on the first storage node to calculate the first inode address,
    wherein reading, using the first inode address, the first object fragment comprises instructing the thread on the first storage node to read the first object fragment, and
    wherein reading the second object fragment using the second inode address comprises instructing a thread on the second storage node to read the second object fragment.

5. The method of claim 1, wherein the first storage node is selected based on resources available on the first storage node and the second storage node.

6. An apparatus for accessing objects in an erasure code supported object storage environment, the apparatus comprising a computer processor, a computer memory operatively coupled to the computer processor, the computer memory having disposed within it computer program instructions that, when executed by the computer processor, cause the apparatus to carry out the steps of:

receiving, from a requesting entity, a read request for an object stored in the object storage environment, wherein the object comprises a plurality of object fragments, and wherein the object corresponds to a plurality of inodes that each includes both an object fragment of the plurality of object fragments and collected inode addresses of each other object fragment of the object;

identifying, using a placement data structure, an object fragment location of a first object fragment of the object;

calculating, based on a filesystem root inode number and the object fragment location, a first inode address for the first object fragment of the object, wherein the first inode address identifies a location on a first storage node;

reading, using the first inode address, the first object fragment and an inode structure, wherein the inode structure for the first inode address comprises a second inode address for a second object fragment of the object, and wherein reading the inode structure for the first object fragment comprises reading, from the inode structure for the first object fragment, the second inode address for the second object fragment, without calculating the second inode address, based on the collected inode addresses of each other object fragment of the object;

reading the second object fragment using the second inode address, wherein the second inode address identifies a location on a second storage node; and providing, to the requesting entity, a reconstructed object comprising the first object fragment and the second object fragment.

7. The apparatus of claim 6, wherein an inode structure for the second object fragment comprises the first inode address of the first object fragment.

8. The apparatus of claim 6, wherein each inode structure for each object fragment comprises each other inode address for each object fragment.

9. The apparatus of claim 6, wherein calculating, based on the filesystem root inode number and the object fragment location, the first inode address for the first object fragment of the object comprises instructing a thread on the first storage node to calculate the first inode address, wherein reading, using the first inode address, the first object fragment comprises instructing the thread on the first storage node to read the first object fragment, and wherein reading the second object fragment using the second inode address comprises instructing a thread on the second storage node to read the second object fragment.

10. The apparatus of claim 6, wherein the first storage node is selected based on resources available on the first storage node and the second storage node.

11. A computer program product for accessing objects in an erasure code supported object storage environment, the computer program product comprising a non-transitory computer readable storage medium having computer program instructions embodied therewith that, when executed, cause a computer to carry out the steps of:

receiving, from a requesting entity, a read request for an object stored in the object storage environment, wherein the object comprises a plurality of object fragments, and wherein the object corresponds to a plurality of inodes that each includes both an object fragment of the plurality of object fragments and collected inode addresses of each other object fragment of the object;

identifying, using a placement data structure, an object fragment location of a first object fragment of the object;

calculating, based on a filesystem root inode number and the object fragment location, a first inode address for the first object fragment of the object, wherein the first inode address identifies a location on a first storage node;

reading, using the first inode address, the first object fragment and an inode structure, wherein the inode structure for the first inode address comprises a second inode address for a second object fragment of the object, and wherein reading the inode structure for the first object fragment comprises reading, from the inode structure for the first object fragment, the second inode address for the second object fragment, without calculating the second inode address, based on the collected inode addresses of each other object fragment of the object;

reading the second object fragment using the second inode address, wherein the second inode address identifies a location on a second storage node; and providing, to the requesting entity, a reconstructed object comprising the first object fragment and the second object fragment.

12. The computer program product of claim 11, wherein an inode structure for the second object fragment comprises the first inode address of the first object fragment.

13. The computer program product of claim 11, wherein each inode structure for each object fragment comprises each other inode address for each object fragment.

14. The computer program product of claim 11, wherein calculating, based on the filesystem root inode number and the object fragment location, the first inode address for the first object fragment of the object comprises instructing a thread on the first storage node to calculate the first inode address, wherein reading, using the first inode address, the first object fragment comprises instructing the thread on the first storage node to read the first object fragment, and wherein reading the second object fragment using the second inode address comprises instructing a thread on the second storage node to read the second object fragment.

15. The computer program product of claim 11, wherein the first storage node is selected based on resources available on the first storage node and the second storage node.

* * * * *

UNITED STATES PATENT AND TRADEMARK OFFICE
CERTIFICATE OF CORRECTION

PATENT NO. : 10,740,288 B2
APPLICATION NO. : 15/367846
DATED : August 11, 2020
INVENTOR(S) : Sasikanth Eda et al.

Page 1 of 1

It is certified that error appears in the above-identified patent and that said Letters Patent is hereby corrected as shown below:

On the Title Page

In item (72), under "Inventors" in column one, delete "Rezaul S. Islam" and insert --Shah Mohammad Rezaul Islam--

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*